United States Patent [19]

Kato et al.

[11] Patent Number: 5,322,714
[45] Date of Patent: Jun. 21, 1994

[54] COATED ARTICLE WITH METALLIC FINISH

[75] Inventors: Yasushi Kato; Hisao Furukawa, both of Kobe, Japan

[73] Assignee: Kanegafuchi Kagaku Kogyo Kabushiki Kaisha, Osaka, Japan

[21] Appl. No.: 785,196

[22] Filed: Nov. 4, 1991

Related U.S. Application Data

[60] Continuation of Ser. No. 640,470, Jan. 11, 1991, abandoned, which is a division of Ser. No. 515,775, Apr. 25, 1990, Pat. No. 4,994,327, which is a continuation of Ser. No. 204,848, Jun. 10, 1988, abandoned, which is a continuation of Ser. No. 18,744, Feb. 24, 1987, abandoned, which is a continuation of Ser. No. 618,774, Jun. 11, 1984, abandoned, which is a continuation of Ser. No. 384,345, Jun. 2, 1982, abandoned.

[30] Foreign Application Priority Data

Jun. 19, 1981 [JP] Japan .................................. 56-95672

[51] Int. Cl.$^5$ ................................ B05D 1/36
[52] U.S. Cl. .................................. 427/407.1; 427/409
[58] Field of Search ...................... 427/387, 407.1, 409

[56] References Cited

U.S. PATENT DOCUMENTS

| | | | |
|---|---|---|---|
| 3,639,147 | 2/1972 | Benefiel et al. | 427/409 |
| 3,706,697 | 12/1972 | Backderf | 524/806 |
| 3,814,716 | 6/1974 | Kowalski et al. | 524/806 |
| 3,983,291 | 9/1976 | Chang | 428/423.4 |
| 4,170,690 | 10/1979 | Armbruster et al. | 428/447 |
| 4,284,668 | 8/1981 | Nixon | 427/355 |
| 4,299,746 | 11/1981 | Frye | 260/29.2 M |
| 4,310,640 | 1/1982 | Kato et al. | 525/100 |
| 4,324,712 | 4/1982 | Vaughn, Jr. | 524/767 |
| 4,334,036 | 6/1982 | Yonezawa et al. | 525/102 |
| 4,359,504 | 11/1982 | Troy | 428/403 |
| 4,368,297 | 1/1983 | Kato et al. | 525/342 |
| 4,371,664 | 2/1983 | Kato et al. | 525/100 |
| 4,399,261 | 8/1983 | Kato et al. | 525/342 |
| 4,403,003 | 9/1983 | Backhouse | 427/407.1 |
| 4,499,150 | 2/1985 | Dowbenko et al. | 427/407.1 |
| 4,499,151 | 2/1985 | Dowbenko et al. | 428/447 |
| 4,503,181 | 3/1985 | Kato et al. | 524/391 |
| 4,518,726 | 5/1985 | Kato et al. | 524/32 |
| 4,994,327 | 2/1991 | Kato et al. | 428/328 |

*Primary Examiner*—Shrive Beck
*Assistant Examiner*—Diana Dudash
*Attorney, Agent, or Firm*—Varndell Legal Group

[57] ABSTRACT

A coated article with metallic finish which comprises a base layer of a paint containing metallic powder and, if necessary, color pigment applied to the substrate and a topcoat applied to said base layer, said topcoat being formed by applying and curing a coating material composed mainly of a silyl group-containing vinyl polymer or copolymer having the main chain composed substantially of a vinyl polymer and at least one silicon atom connected to a hydrolyzable group at the terminal or side chain per molecule.

19 Claims, No Drawings

COATED ARTICLE WITH METALLIC FINISH

This application is a continuation application of Ser. No. 07/640,470, filed Jan. 11, 1991; now abandoned which is a divisional application of Ser. No. 515,775, filed Apr. 25, 1990, now U.S. Pat. No. 4,994,327; which is a continuation application of Ser. No. 204,848, filed Jun. 10, 1988, now abandoned; which is a continuation application of Ser. No. 018,744, filed Feb. 24, 1987, now abandoned; which is a continuation application of Ser. No. 618,774, filed Jun. 11, 1984, now abandoned; which is a continuation application of Ser. No. 384,345, filed Jun. 2, 1982, now abandoned.

BACKGROUND OF THE INVENTION

1. Field of the Invention:

This invention relates to a coated article with metallic finish. More particularly, it relates to a coated article with metallic finish formed by applying a priming coat containing metal powder and, if necessary, a color pigment, to the substrate, and subsequently applying a topcoat containing a vinyl polymer having the main chain composed substantially of vinyl polymer chain and having at least one silyl group having a silicon atom connected to a hydrolyzable group at the side chain or terminal per molecule, and finally curing the coating.

2. Description of the Prior Art:

Heretofore, the metallic finish of automotive bodies has been accomplished with a variety of paints such as nitrocellulose lacquer, modified acrylic lacquer, straight acrylic lacquer, polyurethane paint, and baking enamel. These paints, however, were not satisfactory in fastness to weathering when used as a topcoat for metallic finish. In actual use, the coated film of these paints undergoes cracking, discoloration, blistering, and peeling when exposed to intense sunlight for a long period of time.

SUMMARY OF THE INVENTION

It is an object of this invention to provide a top-coat containing vinyl polymer or copolymer main chains and at least one silyl group having a silicon atom connected to a hydrolyzable group at the side chain or terminal per molecule.

It is another object of this invention to provide a topcoat which is greatly improved in outdoor weatherability and "finish feel".

It is another object of this invention to provide a topcoat which does not require polishing with a fine abrasive compound to make the surface smooth and lustrous.

According to this invention, the top coat gives a beautiful, lustrous finish without such polishing. This leads to labor saving and material saving in the coating process.

DETAILED DESCRIPTION OF THE INVENTION

In this invention, the substrate is iron, aluminum, and other metals; wood and artificial woodlike materials; and thermosetting and thermoplastic moldings with priming, rust preventive treatment, or insect-proofing treatment.

In this invention, the metallic base coat may be aminoalkyl resin, thermosetting acrylic resin, nitrocellulose lacquer, modified acrylic lacquer, straight acrylic lacquer, polyurethene resin, acrylic enamel resin, or silyl group-containing vinyl resin, but is not specifically limited to them. The paint may be of solvent type, non-aqueous dispersion type, multi-component type, power type, slurry type, or aqueous type. The metallic powder and color pigment to be incorporated in the base coat may be aluminum powder, copper powder, mica powder, and usual color pigment for paint. The topcoat may be incorporated with additives such as wetting agent and leveling agent.

The silyl group-containing vinyl polymer or copolymer used in this invention is composed of the main chain which is substantially a vinyl polymer chain and at least one, preferably, two or more silicon atoms connected to a hydrolyzable group at the terminal or side chain per molecule. The silyl group is usually represented by the formula:

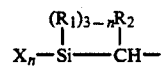

(where X is a hydrolyzable group; $R_1$ and $R_2$ are hydrogen or alkyl group, aryl group, or aralkyl group having 1 to 10 carbon atoms; and n is an integer of 1, 2, or 3.) The hydrolyzable group includes halogens, and alkoxy, acyloxy, ketoxymate, amino, acid amide, aminoxy, mercapto, and alkenyloxy groups.

The silyl group-containing vinyl polymer or copolymer of this invention may be produced in various manners, but may be advantageously produced by (1) hydrosilylation reaction between a hydrosilane and a vinyl polymer or copolymer having carbon-carbon double bonds, and (2) copolymerization of a vinyl compound and a silyl compound having polymerizable double bonds. These processes are described in detail in the following.

(1) The silyl group-containing vinyl polymer or copolymer of this invention can be readily produced by reacting a hydrosilane compound with a vinyl polymer or copolymer having carbon-carbon double bonds in the presence of a catalyst based on Group VIII transition metals. The hydrosilane used in this process has the following formula.

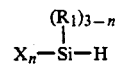

(where; $R_1$ is hydrogen or a monovalent hydrocarbon group having 1 to 10 carbon atoms selected from alkyl group, aryl group, or aralkyl group; X is a hydrolyzable group; and n is an integer of 1, 2, or 3.)

The hydrosilane compound in this formula includes, for example, halosilanes such as methyldichlorosilane, trichlorosilane, and phenyldichlorosilane; alkoxysilanes such as methyldiethoxysilane, methyldimethoxysilane, phenyldimethoxysilane, trimethoxysilane, and triethoxysilane; acyloxysilanes such as methyldiacetoxysilane, phenyldiacetoxysilane, and triacetoxysilane; and other silanes such as methyldiaminoxysilane, triaminoxysilane, methyldiaminosilane, triaminosilane, bis(dimethylketoxymate)methylsilane, bis(cyclohexylketoxymate)methylsilane, methyldiisopropenoxysilane, and triisopropenoxysilane.

The hydrosilane may be used in any amount, but preferably in an amount of 0.5 to 2 times in mole as much as the carbon-carbon double bonds contained in the vinyl polymer or copolymer. The hydrosilane may be used in an amount more than this, but an excess is recovered as unreacted hydrosilane.

According to this invention, a halogenated silane, which is inexpensive and highly reactive, may be readily used as the hydrosilane compound. The silyl group-containing vinyl polymer or copolymer prepared from a halogenated silane cures rapidly at room temperature, liberating hydrogen halide, when exposed to air. If a chlorinated silane is used the hydrogen chloride thus liberated is irritating and corrosive, the use of halogenated silane is limited. Therefore, it is desirable to convert the halogen to a hydrolyzable functional group such as alkoxy, acyloxy, aminoxy, amino, acid amide, ketoxymate, and mercapto group as disclosed in, for example, Japanese Patent Laid-Open No. 91546/1979.

The vinyl polymer or copolymer used in the process (1) of this invention does not contain hydroxyl groups, but otherwise is not specifically limited. Examples include polymer or copolymer of acrylate esters and methacrylate esters such as methyl acrylate, methyl methacrylate, ethyl acrylate, ethyl methacrylate, butyl acrylate, butyl methacrylate, 2-ethylhexyl acrylate, and 2-ethylhexyl methacrylate; carboxylic acids such as acrylic acid, methacrylic acid, itaconic acid, and fumaric acid; acid anhydrides such as maleic anhydride; epoxy compounds such as glycidylacrylate and glycidylmethacrylate; amino compounds such as diethylaminoethylacrylate, diethylaminoethylmethacrylate, and aminoethylvinylether; amide compounds such as acrylamide, methacrylamide, diamide itaconate, α-ethyl acrylamide, crotonamide, diamide fumarate, diamide maleate, N-butoxymethylacrylamide, and N-butoxymethylmethacrylamide; and other vinyl compounds such as acrylonitrile, iminolmethacrylate, styrene, α-methylstyrene, vinyl chloride, vinyl acetate, and vinyl propionate. When these vinyl compounds are homopolymerized or copolymerized, allyl acrylate, allyl methacrylate, or diallyl phthalate may be copolymerized in order to introduce the terminals or side chains of carbon-carbon double bonds for hydrosilylation in the vinyl polymer or copolymer. The quantity of such monomer can be determined according to the number of silyl groups required in the polymer. In addition, the molecular weight may be controlled by adding a chain transfer agent such as n-dodecylmercaptan and t-dodecylmercaptan. The polymerization of these vinyl compounds may be accomplished with or without solvent, and where a solvent is used, inactive solvents such as ethers, hydrocarbons, and acetate esters are preferable.

According to this invention, a catalyst of transition metal complex is required in the reaction of a hydrosilane compound with the carbon-carbon double bond. A complex of platinum, rhodium, cobalt, palladium, or nickel belonging to Group VIII is preferably used. The hydrosilylation may be accomplished at any temperature from 50° to 150° C. and the reaction will take 1 to 10 hours.

(2) According to the other process of this invention, the silyl group-containing vinyl polymer or copolymer may be produced by radical polymerization of a vinyl compound with a silane compound represented by the formula:

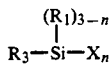

(where $R_1$ is a monovalent hydrocarbon group selected from alkyl group, aryl group, or aralkyl group having 1 to 10 carbon atoms; $R_3$ is an organic residue having a polymerizable double bond; X is a hydrolyzable group; and n is an integer of 1, 2, or 3.)

The silane compound used in this invention includes, for example:

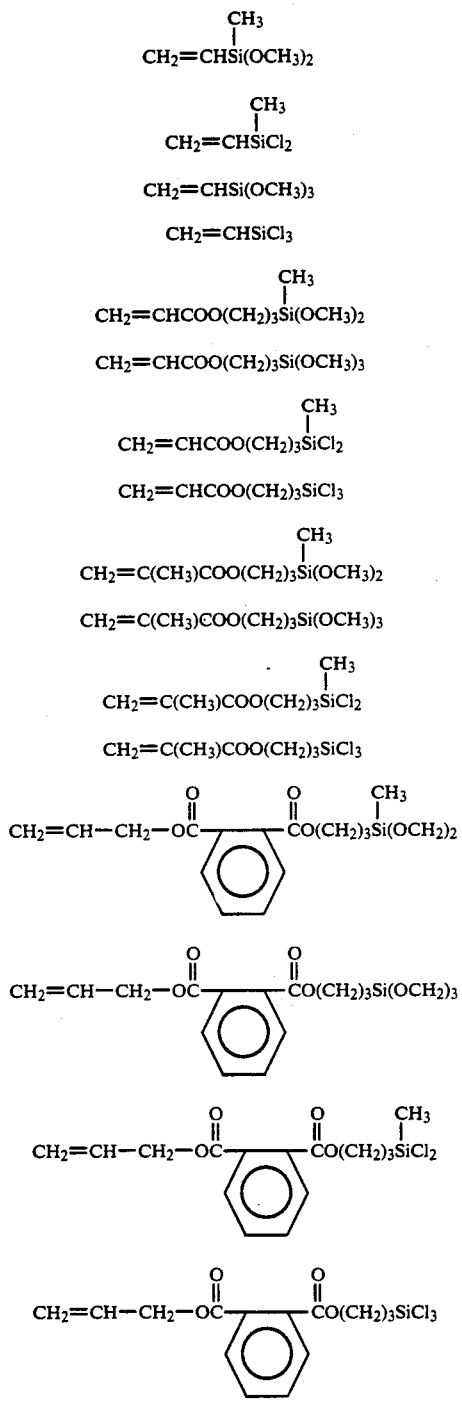

These silane compounds may be synthesized in various ways. For example, they may be prepared by reacting acetylene, allyl acrylate, allyl methacrylate, or diallyl phthalate with methyldimethoxysilane, methyldichlorosilane, trimethoxysilane, or trichlorosilane in the presence of a catalyst based on Group VIII transition metals.

Those vinyl compounds used for the synthesis of the vinyl homopolymer or copolymer in process (1) may also be used in this process (2). In addition to them, vinyl compounds containing a hydroxyl group may also be used. Examples of such vinyl compounds include 2-hydroxyethyl acrylate, 2-hydroxyethyl methacrylate, 2-hydroxypropyl acrylate, 2-hydroxypropyl methacrylate, 2-hydroxyvinyl ether, N-methylolacnylamide and ARONIX 5700 (product of Toa Gosei Co., Ltd.).

These vinyl compounds and silane compounds may be copolymerized by the conventional solution polymerization at 50° to 150° C. with a radical initiator and a chain transfer agent such as n-dodecylmercaptan and t-dodecylmercaptan for control of molecular weight, with or without solvent. Where a solvent is used, an inactive solvent such as ethers, hydrocarbons, and acetate esters are preferable.

The silyl group-containing vinyl polymer or copolymer thus obtained is such that the hydrolyzable group therein can be converted in the way as disclosed in Japanese Patent Laid-Open No. 91546/1979.

In the way mentioned above, the silyl group-containing vinyl polymer or copolymer having the main chain composed substantially of vinyl polymer chain and having at least one silyl group having a silicon atom connected to a hydrolyzable group at the side chain or terminal per molecule can be produced.

The silyl group-containing vinyl polymer or copolymer is not specifically limited in molecular weight. But it should preferably have a molecular weight of 1,000 to 30,000, more preferably 2,000 to 10,000, from the standpoint of storage stability and properties of cured topcoat film. The low molecular weight like this is preferred because the resultant paint is low in viscosity and requires less solvent. This leads to material saving.

The silyl group-containing vinyl polymer or copolymer is improved in pot life and adhesion of coated film, if it is incorporated with the above-mentioned vinyl unsaturated compound containing carboxyl group, hydroxyl group, amino group, or amide group.

According to this invention, the curing of the topcoat after application may be performed with or without a curing accelerator depending on conditions. Where rapid curing at a comparatively low temperature is required, as in automobile repair, it is advantageous to use a curing catalyst as enumerated below.

Metal salt of carboxylic acid such as alkyl titanate, stannous octoate, dibutyltin dilaurate, and lead octoate; sulfide or mercaptide type organotin compounds such as monobutyltin sulfide and dioctyltin mercaptide; acid catalyst such as p-toluenesulfonic acid and phthalic acid; amines such as triethylenediaminde and N-$\beta$-aminoethyl-$\gamma$-aminopropyltrimethoxysilane; and alkali catalyst such as sodium hydroxide. These curing catalysts should be used preferably in an amount of 0.001 to 10 wt % based on 100 wt % of the polymer.

The curing catalysts are not limited to those enumerated above, but the following organotin compounds may be used. Carboxylic acid type organotin compounds:
(n-$C_4H_9$)$_2$Sn(OCOC$_{11}$H$_{23}$-n)$_2$
(n-$C_4H_9$)$_2$Sn(OCOCH=CHCOOCH$_3$)$_2$
(n-$C_4H_9$)$_2$Sn(OCOCH=CHCOOC$_4$H$_9$-n)$_2$
(n-$C_8H_{17}$)$_2$Sn(OCOC$_{11}$H$_{22}$-n)$_2$
(n-$C_8H_{17}$)$_2$Sn(OCOCH=CHCOOCH$_3$)$_2$
(n-$C_8H_{17}$)$_2$Sn(OCOCH=CHCOOC$_4$H$_9$-n)$_2$
(n-$C_8H_{17}$)$_2$Sn(OCOCH=CHCOOC$_8$H$_{17}$-iso)$_2$
Sn(OCOC$_8$H$_{17}$-n)$_2$ Mercaptide type organotin compounds:
(n-$C_4H_9$)$_2$Sn(SCH$_2$COO)
(n-$C_4H_9$)$_2$Sn(SCH$_2$COOC$_8$H$_{17}$-iso)$_2$
(n-$C_8H_{17}$)$_2$Sn(SCH$_2$COO)
(n-$C_8H_{17}$)$_2$Sn(SCH$_2$CH$_2$COO)
(n-$C_8H_{17}$)$_2$Sn(SCH$_2$COOCH$_2$CH$_2$OCOH$_2$S)
(n-$C_8H_{17}$)$_2$Sn(SCH$_2$COOCH$_2$CH$_2$CH$_2$CH$_2$OCOH$_2$S)
(n-$C_8H_{17}$)$_2$Sn(SCH$_2$COOC$_8$H$_{17}$-iso)$_2$
(n-$C_8H_{17}$)$_2$Sn(SCH$_2$COOC$_{12}$H$_{25}$-n)$_2$

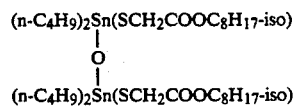

Sulfide type organotin compounds:

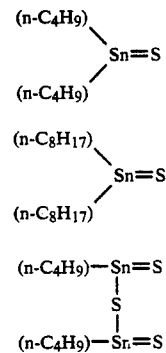

Organotin oxides:
(n-$C_4H_9$)$_2$SnO
(n-$C_8H_{17}$)$_2$SnO

Reaction products of an organotin oxide and an ester such as ethyl silicate, ethyl silicate 40, dimethyl maleate, diethyl maleate, dioctyl maleate, dimethyl phthalate, diethyl phthalate, and dioctyl phthalate.

In this invention, a solvent may be used, if necessary, in addition to the above-mentioned components. Any solvent which solubilizes both the silyl group-containing vinyl polymer or copolymer and the curing catalyst, or which is miscible with them and does not cause precipitation may be used. Examples of such solvents are aliphatic hydrocarbons, aromatic hydrocarbons, halogenated hydrocarbons, alcohols, ketones, esters, ethers, alcohol esters, ketone alcohols, ether alcohols, ketone ethers, ketone esters, and ester ethers which are commonly used for paints and coatings. If these solvents contain an alkyl alcohol and/or hydrolyzable ester, the one-component composition of this invention is further improved in stability. The alkyl alcohol having 1 to 10 carbon atoms is preferably used. Examples of such alkyl alcohol include methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol, octyl alcohol, and cellosolve. Examples of hydrolyzable esters include trialkyl orthoformate such as trimethyl orthoformate, triethyl orthoformate, tripropyl orthoformate, and tributyl orthoformate; and tetraalkyl orthosilicate such as tetramethyl orthosilicate, tetraethyl orthosilicate, tetrapropyl orthosilicate, and terabutyl orthosilicate ethyl silicate 40; and hydrolyzable organic silicon compounds of the formula: $R_{4-n}SiX_n$ wherein X is a hydrolyzable group, R is a monovalent organic group optionally containing a functional group, and n is an integer of 1–4, preferably 3 or 4, such as methyltrimethoxysilane, methyltriethoxysilane, ethyltrimethoxysilane, ethyltriethoxysilane, phenyltrimethoxysilane, phenyltriethoxysilane, vinyltrimethoxysilane, vinyltriethoxysilane, γ-methacryloxypropyltrimethoxysilane, γ-mercaptopropyltrimethoxysilane, γ-glycidoxypropyltrimethoxysilane, -aminopropyltrimethoxysilane etc., and partial hydrolyzates thereof. The quantity of the solvent to be used varies depending on the molecular weight or composition of the silyl-group containing vinyl polymer or copolymer, but it is determined according to the solid concentration or consistency required in actual use.

The paint of this invention may be further incorporated with a silane coupling agent or a reaction product thereof which contains at least one silicon atom connected to a hydrolyzable group per molecule, whereby the adhesion of coated film can be improved.

The silyl group-containing vinyl polymer of this invention having the main chain composed substantially of vinyl polymer chain and having at least one silyl group having a silicon atom connected to a hydrolyzable group at the side chain or terminal per molecule cures on baking at high temperatures without curing catalyst. However, the use of a curing catalyst is effective in the case where it is necessary to cure the paint at room temperature or comparatively low temperatures with forced drying as in automobile repair. This curing catalyst may be added to the silyl group-containing vinyl polymer or copolymer, with or without solvent or diluent, to prepare one-package formulations. This is very advantageous in workability. The one-package formulation is particularly preferred the case of urethane resin paint which, despite its good surface finish and weathering resistance, has a disadvantage that the curing catalyst and solvent (or diluent) have to be metered and mixed prior to application. Such a two-package paint is inferior in workability to a one-package paint. Thus, there has long been a strong demand for a one-package paint which is free of toxicity and yet superior in the film performance such as finish and weatherability.

Making the paint one-package type may be accomplished by properly selecting the silyl group-containing vinyl polymer or copolymer, a curing catalyst, and, if necessary, a solvent. The kind of each component and their composition are not specifically limited. The topcoat of this invention is superior in weatherability to conventional ones, but it may be incorporated with additives such as UV absorber and antioxidant. The UV absorber used in this invention is not specifically limited, but those which are in general use may be used. Examples are benzophenones such as 2-hydroxy-4-methoxybenzophenone, 2,2'-dihydroxy-4-methoxybenzophenone, 2-hydroxy-4-octoxybenzophenone, and 2,4-dihydroxybenzophenone resorcinol monobenzoate; benzotriazoles such as 2(2'-hydroxy-5-methylphenyl)-benzotriazole, and Tinuvin P, Tinuvin 320, Tinuvin 326, Tinuvin 327, and Tinuvin 328 (products of Ciba-Geigy Corp.); acrylates such as 2-ethylhexyl-2-cyano-3,3-diphenyl acrylate and ethyl-2-cyano-3,3-diphenyl acrylate; salicylates such as phenyl salicylate, 4-t-butylphenyl salicylate, and p-octylphenyl salicylate; and Ni compounds such as Ni-bisoctylphenyl sulfide and [2,2'-bisthio(4-t-octylphenolate)]-n-butylamine Ni. The Ni UV absorber may be limited in its application because some of them are colored.

The paint of this invention may be improved further in weatherability by incorporating therein an antioxidant which is in general use in the art. Examples of such antioxidants are phenols such as 2,6-di-t-butyl-4-methylphenol, 2,2'-methylenebis(4-methyl-6-t-butyl phenol), 4,4'-butylidenebis(3-methyl-6-t-butylphenol), 4,4'-thiobis(3-methyl-6-t-butylphenol), 2,2'thiobis(4-methyl-6-t-butylphenol), 1,3,5-trimethyl-2,4,6-tris(3,5-di-t-butyl-4-hydroxybenzyl)benzene, and 1,3,5-tri(2-methyl-4-hydroxy-5-t-butylphenol)butane; hindered phenols such as IRGANOX 1010 and IRGANOX 1076 (products of Ciba-Geigy Corp.); sulfides such as dilaurylthiodipropionate and distearylthiodipropionate; and phosphites such as tridecyl phosphite, diphenyldecyl phosphite, triphenylphosphite, and trinonylphenyl phosphite.

The coating composition used in this invention cures, forming a network structure, when exposed to the atmosphere at room temperature.

The paint of this invention may be applied in the conventional manner including spray coating, electrostatic coating, and brush coating.

The invention will be described in detail with reference to the following examples.

I. PREPARATION OF TOPCOAT PAINTS

EXAMPLE 1

The following components were charged into a reactor and reacted at 120° C. for 10 hours:

| | |
|---|---|
| Styrene | 700 g |
| Butyl acrylate | 400 g |
| Methylmethacrylate | 700 g |
| γ-methacryloxypropyltrimethoxysilane | 500 g |
| Azobisisobutyronitrile | 100 g |
| Toluene | 500 g |
| Butyl acetate | 500 g | whereby a copolymer of styrene-butyl acrylate methyl methacrylate γ-methacryloxypropyltrimethoxysilane was prepared.

According to GPC analysis, this polymer was found to have a molecular weight of 8,000, and according to the analysis of residual monomer, the conversion in polymerization was 97.5%.

EXAMPLE 2

The following components were charged into a reactor and reacted at 100° C. for 10 hours:

| | |
|---|---|
| Styrene | 300 g |
| Butyl methacrylate | 1,500 g |
| Acrylamide | 80 g |
| γ-methacryloxypropyltrimethoxysilane | 300 g |
| Azobisisobutyrovaleronitrile | 100 g |
| Toluene | 500 g |
| Butyl acetate | 500 g | whereby a copolymer of styrene-butyl acrylate-acrylamide-γ-methacryloxypropyltrimethoxysilane was prepared. The molecular weight was 6,000 (as determined by GPC method, to be repeated hereinafter), and the conversion was 97%.

EXAMPLE 3

The following components were charged into a reactor and reacted at 120° C. for 10 hours:

| | |
|---|---|
| Styrene | 300 g |
| Butyl acrylate | 400 g |
| Methyl methacrylate | 1,100 g |
| Maleic anhydride | 20 g |
| γ-methacryloxypropyltrimethoxysilane | 300 g |
| Azobisisobutyronitrile | 100 g |
| Toluene | 500 g |
| Butyl acetate | 500 g | whereby a silyl group-containing vinyl polymer was prepared. The molecular weight was 8,000 and the conversion was 98%.

EXAMPLE 4

The following components were charged into a reactor and reacted at 90° C. for 10 hours:

| | |
|---|---|
| Styrene | 300 g |
| Butyl acrylate | 400 g |
| Methyl methacrylate | 1,100 g |
| Allyl methacrylate | 150 g |
| n-Dodecylmercaptan | 40 g |
| Azobisisobutyronitrile | 20 g |
| Toluene | 500 g |
| Butyl acetate | 500 g | whereby an allyl group-containing vinyl copolymer was prepared. The conversion was 98%. The resultant copolymer solution was incorporated with a solution of trimethoxysilane 150 g and chloroplatinic acid 0.005 g dissolved in 150 ml of isopropanol and reacted in a sealed reactor for 6 hours for addition of trimethoxysilane to the allyl group on the side chain of the copolymer to yield a silyl group-containing vinyl copolymer. The molecular weight of the resulting copolymer was 9,000.

II. PREPARATION OF COATED ARTICLES WITH METALLIC FINISH

The reaction products prepared in Examples 1 to 4 were incorporated with a curing catalyst as shown in Table 1 for 100 parts by weight of the silyl group-containing vinyl copolymer, and then diluted with xylene so that the solution viscosity as measured by the Ford cup method became 15 seconds.

An aluminum powder-containing metallic acrylic urethane paint (Auto V top, silver, made by Dai Nippon Toryo Co., Ltd.) or an aluminum powder-containing metallic acrylic lacquer (Acrylic 1000, silver, made by Kansai Paint Co. Ltd.) was applied to mild steel plates. About 10 minutes later, the viscosity-adjusted solutions of the silyl group-containing vinyl copolymers prepared in Examples 1 to 4 were spray coated as a topcoat.

For comparison, a mild steel plate was coated with a metallic acrylic urethane paint (Auto V top, silver), and about 10 minutes later, an acrylic urethane topcoat (Auto V Top, clear, made by Dai Nippon Toryo Co., Ltd.) was spray coated. (Comparative Example 1). In the same way, a mild steel plate was coated with a metallic acrylic urethane paint (Auto V top, silver) and then a clear acrylic urethane paint (Auto V top, silver) and then a clear acrylic lacquer (Acryl 1000, clear) was spray coated. (Comparative Example 2).

The coated specimens were cured at 60° C. for 40 minutes. One week later, the coating film was subjected to pencil hardness test, surface gloss measurement, gasoline resistance test, thinner resistance test, yellowing resistance test, and accelerated weathering test with irradiation for 2,000 hours using a sunshine weather-O-meter. The results are shown in Table 1.

TABLE 1

| | Example 1 | Example 2 | Example 3 | Example 4 | Comparative Example 1 | Comparative Example 2 |
|---|---|---|---|---|---|---|
| Metallic base | Acrylic urethane | Acrylic urethane | Acrylic urethane | Acrylic lacquer | Acrylic urethane | Acrylic urethane |
| Topcoat | (Example 1) | (Example 2) | (Example 3) | (Example 4) | Acrylic urethane (clear) | Acrylic lacquer (clear) |
| Pencil hardness | 2H | 2H | 2H | 2H | 2H | HB |
| Surface gloss (%) | 94 | 95 | 94 | 96 | 94 | 80 |
| Gasoline resistance | o | o | o | o | o | x |
| Thinner resistance | o | o | o | o | o | x |
| Yellowing resistance | 4.3 | 3.4 | 4.5 | 4.6 | 8.4 | |
| Weathering resistance (Retention (%) of gloss) | 90 | 98 | 93 | 95 | 50 | 5 |

Notes to Table 1.

1) Curing catalysts for the topcoats. Curing catalysts were added as follows prior to application for 100 parts by weight of the silyl group-containing vinyl copolymer.

In Example 1, 1 part by weight of dioctyltin carboxylate.

In Example 2, 1 part by weight of dioctyltin carboxylate

In Example 3, 1 part by weight of dioctyltin carboxylate and 2 parts by weight of dioctyltin mercaptide.

In Example 4, 1 part by weight of dioctyltin carboxylate and 2 parts by weight of dioctylin mercaptide.

2) Pencil hardness test: In accordance with JIS S-5400.

3) Surface gloss: Determined by measuring reflectance at 60°.

4) Gasoline resistance: Determined by observing softening and hardness change of the film surface after immersion in regular gasoline at room temperature for 2 hours.

No change ... o
Changed ... x

5) Thinner resistance: Determined by observing the change such as softening and blistering that takes place when 1 cc of thinner is placed on the film surface.

No change ... o
Changed ... x

6) Yellowing resistance: Determined by measuring, in terms of color difference (ΔE value), the color change that takes place when the coating film is exposed to a germicidal lamp (made by Mitsubishi Denki Co., Ltd., Model GL-15) for 24 hours.

7) Weathering resistance: Expressed as retention (%) of surface gloss in terms of reflectance at 60° before and after irradiation for 2,000 hours using a sunshine weather-O-meter.

What is claimed is:

1. A process for preparing a coating article with metallic finish which comprises applying a base layer of a paint containing metallic powder to a substrate and applying a topcoat to said base layer, said topcoat being formed by applying and curing a coating material consisting essentially of a silyl group-containing vinyl polymer or copolymer having a main chain consisting essentially of a vinyl polymer and at least one silicon atom connected to a hydrolyzable group at a terminal or side chain per molecule.

2. A process as set forth in claim 1, wherein the silyl group-containing vinyl polymer or copolymer has a molecular weight from 1,000 to 30,000.

3. A process as set forth in claim 1, wherein the silyl group-containing vinyl polymer or copolymer has a molecular weight from 2,000 to 10,000.

4. A process as set forth in claim 1, wherein the silyl group-containing vinyl copolymer contains maleic anhydride as the copolymer component.

5. A process as set forth in claim 1, wherein the silyl group-containing vinyl copolymer contains acrylamide as the copolymer component.

6. A process as set forth in claim 1, wherein the hydrolyzable group connected to the silicon atom contained in the silyl group-containing vinyl polymer or copolymer is an alkoxy group.

7. The process of claim 1, wherein the topcoat is applied 10 minutes after applying the base layer and the base layer and topcoat are cured together.

8. A process for preparing a coated article with metallic finish which comprises applying a base layer of a paint containing metallic powder to a substrate and applying a topcoat to said base layer, said topcoat being formed by applying and curing a one package coating composition comprising (A) a coating material consisting essentially of a silyl group-containing vinyl polymer or copolymer having a main chain consisting essentially of a vinyl polymer and at least one silicon atom connected to a hydrolyzable group at a terminal or side chain per molecule, (B) a curing catalyst, and (C) a solvent.

9. A process as set forth in claim 8, wherein the curing catalyst is an organotin compound of carboxylic acid.

10. A process as set forth in claim 8, wherein the curing catalyst is an organotin compound of mercaptide having an Sn—S bond.

11. A process as set forth in claim 8, wherein the curing catalyst is an organotin compound of sulfide having an Sn=S bond.

12. A process as set forth in claim 8, wherein the solvent contains methyl orthoformate.

13. A process as set forth in claim 8, wherein the solvent contains an alkyl alcohol.

14. A process as set forth in claim 8, wherein the solvent contains ethyl silicate.

15. The process of claim 8, when the topcoat is applied 10 minutes after applying the base layer and the base layer and topcoat are cured together.

16. A process for coating a substrate which comprises applying a basecoating composition containing a metal powder to a substrate, subsequently applying to the basecoating a clear topcoating composition consisting essentially of a silyl group-containing vinyl polymer or copolymer having a main chain consisting essentially of a vinyl polymer and at least one silicon atom connected to a hydrolyzable group at a terminal or side chain per molecule.

17. The process of claim 16, wherein the basecoating composition contains a color pigment.

18. The process of claim 16, including curing the basecoating and topcoating together.

19. The process of claim 16, wherein the topcoating is applied 10 minutes after applying the basecoating composition and the basecoating and topcoating are cured together.

* * * * *